United States Patent
Liu et al.

(10) Patent No.: US 11,135,562 B2
(45) Date of Patent: *Oct. 5, 2021

(54) MAGNETIC ADSORBENT FOR REMOVING ARSENIC AND ANTIMONY BY MEANS OF ADSORPTION-SUPERCONDUCTING MAGNETIC SEPARATION AND PREPARATION METHOD THEREFOR

(71) Applicant: Research Center for Eco-Environmental Sciences, Chinese Academy of Sciences, Beijing (CN)

(72) Inventors: Ruiping Liu, Beijing (CN); Zenglu Qi, Beijing (CN); Lijun Zhu, Beijing (CN); Huijuan Liu, Beijing (CN); Huachun Lan, Beijing (CN); Jiuhui Qu, Beijing (CN)

(73) Assignee: Research Center for Eco-Environmental Sciences, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/724,371

(22) Filed: Dec. 22, 2019

(65) Prior Publication Data
US 2020/0139341 A1     May 7, 2020

Related U.S. Application Data

(63) Continuation of application No. 15/805,141, filed on Nov. 7, 2017, now Pat. No. 10,569,250, and a continuation of application No. PCT/CN2015/097832, filed on Dec. 18, 2015.

(30) Foreign Application Priority Data

Dec. 7, 2015    (CN) .......................... 201510891129.0

(51) Int. Cl.
    *B01J 20/06*       (2006.01)
    *B01J 20/02*       (2006.01)
    *C02F 1/48*        (2006.01)
    *B01J 20/32*       (2006.01)
    *B01J 20/28*       (2006.01)
    *B01J 20/30*       (2006.01)
    *C02F 1/28*        (2006.01)
    *C02F 101/10*     (2006.01)
    *C02F 101/20*     (2006.01)

(52) U.S. Cl.
    CPC ........... *B01J 20/0229* (2013.01); *B01J 20/06* (2013.01); *B01J 20/28009* (2013.01); *B01J 20/28047* (2013.01); *B01J 20/3085* (2013.01); *B01J 20/3204* (2013.01); *B01J 20/3236* (2013.01); *C02F 1/281* (2013.01); *C02F 1/481* (2013.01); *B01J 2220/42* (2013.01); *C02F 2101/105* (2013.01); *C02F 2101/20* (2013.01)

(58) Field of Classification Search
None
See application file for complete search history.

(56) References Cited

U.S. PATENT DOCUMENTS

| | | | |
|---|---|---|---|
| 9,050,605 B2 * | 6/2015 | Guo | ......................... H01F 1/42 |
| 10,569,250 B2 * | 2/2020 | Liu | ...................... B01J 20/3236 |
| 2013/0105397 A1 * | 5/2013 | Shukla | ..................... B01J 37/10 210/663 |
| 2018/0224436 A1 * | 8/2018 | Edwards | .............. G01N 33/558 |

FOREIGN PATENT DOCUMENTS

WO    WO-2011086567 A1 *   7/2011        B01J 20/28007

* cited by examiner

*Primary Examiner* — Chester T Barry

(57) ABSTRACT

A magnetic adsorbent, preparation method therefor and application thereof. The magnetic adsorbent is made by loading a weakly material with high adsorption capacity, an iron-based gel, onto a strongly magnetic ferrite material with low adsorption capacity by means of in-situ reaction. The magnetic adsorbent is used for removing heavy metal pollutants and phosphate pollutants from water.

4 Claims, No Drawings

MAGNETIC ADSORBENT FOR REMOVING ARSENIC AND ANTIMONY BY MEANS OF ADSORPTION-SUPERCONDUCTING MAGNETIC SEPARATION AND PREPARATION METHOD THEREFOR

CROSS REFERENCE TO RELATED APPLICATION

This application is a continuation of U.S. patent application Ser. No. 15/805,141, filed on Nov. 7, 2017, now U.S. Pat. No. 10,569,250.

TECHNICAL FIELD

The present disclosure belongs to the technical field of water treatment, and particularly relates to a magnetic adsorbent for removing heavy metals and a method for removing heavy metals such as arsenic, antimony and the like in water by coupling adsorption and superconducting magnetic separation.

BACKGROUND ART

Arsenic and antimony are heavy metal elements having high toxicity, and their presence in the environment will have a serious impact on human health and ecological safety. There are drinking water safety problems caused by arsenic pollution of natural groundwater around the world. And in terms of antimony, it is mainly due to drinking water source or water body antimony pollution considered to be caused by antimony ore mining and antimony-containing wastewater discharge. In Chinese "drinking water sanitary standard" (GB5749-2006), stricter regulations are made on the arsenic concentration limit, requiring that the maximum concentration of arsenic in drinking water must be lower than 10 μg/L and the concentration limit of antimony is 5 μg/L.

In recent ten years, a lot of research and technological developments on removal of arsenic and antimony have been carried out both at home and abroad. Removal methods such as adsorption, flocculation-precipitation-filtration, flocculation-direct filtration, electrodialysis, ion exchange, membrane separation and the like have been researched systematically. Adsorption method is still one of best methods for removing arsenic and antimony in water. In terms of adsorbing materials for removing arsenic and antimony, adsorbents reported at home and abroad include materials such as active alumina, red mud, modified active carbon, hydroxy ferric oxide, GFH®, READ-As®, manganese sand, hydrated manganese oxide, ferric oxide-alumina composite nano material, iron-manganese composite oxide/diatomite and the like. For example, the ferric oxide-alumina composite nano material (Patent application No.: CN200710118307.1) invented by CAI Yaqi et al. has a fine particle size and a large specific surface area, thereby exhibiting a strong capability to remove pollutants such as arsenic in water. In a design process of an adsorbent, there is an unavoidable contradiction that the smaller the particle size is, the stronger adsorption performance to the waste is, but requirements for solid-liquid separation are stricter; on the contrary, if the particle size is increased and the particles are used as fillings for adsorbent bed, the adsorption performance decreases. The development of a technical method for effectively improving the solid-liquid separation may be the key to solve the above contradiction.

Materials are magnetized to form magnetic functional adsorbing materials, which are widely researched internationally, but there is still no case of pilot scale or engineering application scale up to now. The reason is that there is still no efficient, economical and capable of being industrialized magnetic separation device. In view of this problem, Jiangsu Jack-Zhongke Superconducting Technologies Co., Ltd. carried out system development, and obtained important breakthroughs in superconducting separation of magnetic materials, forming a series of key technologies (such as CN201110053441, CN201310583350, CN201310516009). On the basis of early research and development, the inventors of the present invention propose that a weakly magnetic material, iron-based gel having a strong adsorption capacity is supported on a ferrite material having a weak adsorption capacity but strong magnetism by means of reacting in situ, thereby a material having both a strong adsorption capacity and an excellent magnetic separation characteristic is obtained. Solid-liquid separation is completed by a continuous superconducting magnetic separation system after the material adsorbs arsenic and antimony. CN103736586A discloses a continuous superconducting magnetic separation system and an application process thereof. The continuous superconducting magnetic separation system comprises a vertical cylindrical superconducting magnet, high gradient dielectric networks, a high-medium network supporting system positioned at the lower end portion of the cylinder in the superconducting magnet, a high-gradient medium rotating disc provided with a bayonet, a high-gradient medium field outside transmission system, and a press system for realizing the entry of the high-gradient medium to the magnetic field and the exit of the high-gradient medium from the magnetic field. After a material for separation enters the superconducting magnetic field, magnetic particles are adsorbed in the high-gradient medium network, and nonmagnetic particles are collected at the lower end of the superconducting magnet. The high-gradient medium networks are stationary in the superconducting magnet through a magnetic separation zone support system, and enter or exit from the magnetic field through the press system one by one. The high-gradient medium networks adsorbed with the magnetic particles exit from the magnetic field, sequentially enter a cleaning zone and a magnetic field outside transmission zone through the high-gradient medium rotating disc, and afresh enter the magnetic separation zone through the press system over the superconducting magnet, so as to achieve a continuous operation.

SUMMARY OF THE INVENTION

One objective of the present disclosure is to provide a magnetic adsorbent which is efficient, economically feasible and easy for mass application in engineering.

Another objective of the present disclosure is to provide a preparation method of the magnetic adsorbent.

Another objective of the present disclosure is to provide an application method of the magnetic adsorbent.

The magnetic adsorbent according to the present disclosure is designed in such a way that: the iron-based gel has a strong adsorption capacity and weak magnetism; the ferrite has strong magnetism and possesses a certain adsorption capacity to arsenic and antimony. A weakly magnetic material, an iron-based gel having a strong adsorption capacity is supported on a ferrite material having a weak adsorption capacity but strong magnetism by means of reacting in-situ, thereby a material having both a strong adsorption capacity and an excellent magnetic separation characteristic is obtained. A solid-liquid separation is carried out for the adsorbent adsorbed with arsenic and arsenic pollutants in a superconducting magnetic separation unit, thus arsenic in water is purified and removed. The magnetic adsorbent and adsorption-superconducting magnetic separation method can be used for removing arsenic and antimony pollutants in drinking water, groundwater, industrial wastewater and water body such as lake, reservoir, river and the like, and can also be used for removing heavy metals such as copper, chromium, cadmium, lead, thallium and the like and pollutants such as phosphate in water and for controlling water body pollution of sudden pollution events.

The magnetic adsorbent according to the present disclosure is prepared by loading an iron-based gel on the surface of ferrite.

The ferrite may be selected from at least one of manganous ferrite, copper ferrite, magnesium ferrite, ferroferric oxide and the like.

The iron-based gel is prepared by the following method:

(1) formulating a ferric salt solution and an alkali solution, in which the concentration range of ferric salt is 0.5~10 mmol/L and the concentration range of $OH^-$ in the alkali solution is 0.1~10 mol/L;

(2) under conditions of sufficient stirring, dropping the alkali solution slowly into the ferric salt solution and balancing the pH value to 4~7.5;

(3) continuing stirring for 5~30 min and standing for 60 min~24 h.

The ferric salt may be selected from at least one of ferric chloride, ferric sulfate, ferric nitrate, polyferric chloride, polyferric sulfate, polyferric nitrate and the like.

The alkali solution may be selected from at least one of sodium hydroxide, potassium hydroxide, aqueous ammonia and the like.

The iron-based gel is loaded on the surface of ferrite using a method as described below:

(1) under conditions of sufficient stirring, adding a polyacrylamide solution slowly into a ferrite solution, in which the mass ratio of polyacrylamide to ferrite is 1:100~1:50000, and reacting for 30~120 min to obtain a ferrite suspension;

(2) under conditions of sufficient stirring, adding an iron-based gel suspension slowly into the ferrite suspension obtained in (1), in which the mass ratio of the iron-based gel to ferrite is 1:10~1:500, and reacting for 60~240 min.

The magnetic adsorbent according to the present disclosure can be used for removing arsenic and antimony pollutants in drinking water, groundwater, industrial wastewater and water body such as lake, reservoir, river and the like, and can also be used for removing heavy metals such as copper, chromium, cadmium, lead, thallium and the like and pollutants such as phosphate in water and for controlling water body pollution of sudden pollution events.

The present disclosure also provides an application method of the magnetic adsorbent:

adding the magnetic adsorbents into to-be-treated water in the addition amount of 0.1 mg/L~5 g/L and then sufficiently mixing; after 0.5 min~5 min of the mixing reaction, bringing the water added with the magnetic adsorbents into a continuous superconducting magnetic separation system for executing solid-liquid separation, and discharging the treated water when the outflow from the separation system meets drinking water sanitary standard.

The continuous superconducting magnetic separation system is a superconducting magnetic separation system described in Patent Application No. CN103736586A.

Beneficial effects of the present disclosure are as follows:

the iron-based gels according to the present disclosure has weak magnetism and are difficult to be completely separated using superconducting magnetic separation; if ferrite is used alone, it is difficult to ensure that pollutants such as arsenic and antimony in water are transferred from a aqueous phase to a solid phase. The iron-based gel is loaded on ferrite, and an adsorbing material having both a strong adsorption capacity and an excellent magnetic separation characteristic can be obtained. The loading method according to the present disclosure has a simple operation process and is easy to achieve; water treatment agents or materials used for preparing the magnetic adsorbing material are inexpensive and easy to obtain; the balance between the particle size and the adsorption performance of particulate matter can be well achieved by the superconducting magnetic separation method. The method according to the present disclosure has the following technical advantages: adsorption capacity is high (saturation adsorption capacity can be 150 mg/g); solid-liquid separation speed is fast and the separation can be completed in few seconds, while conventional solid-liquid separation takes dozens of minutes to several hours; technical adaptability of the method is strong, it can be used for removing a single pollutant or a variety of pollutants. The adsorption-superconducting magnetic separation method mentioned in the present disclosure can be used for removing arsenic and antimony pollutants in drinking water, groundwater, industrial wastewater and water body such as lake, reservoir, river and the like (a concentration range of arsenic and antimony in the to-be-treated water is 0.05 mg/L~50 mg/L); and can also be used for removing heavy metals such as copper, chromium, cadmium, lead, thallium and the like and pollutants such as phosphate in water and for controlling water body pollution of sudden pollution events. After treatment, the concentration of heavy metals in the water can meet requirements such as drinking water sanitary standard, industrial wastewater discharge standard or quality standard of surface water environment.

DETAILED DESCRIPTION

The present disclosure will be described below by specific embodiments. Unless otherwise specified, the technical means used in the present disclosure are methods known by those skilled in the art. In addition, the embodiments should be understood as illustrative but not restrictive to the scope of the disclosure, and the spirit and scope of the disclosure are defined only by the claims. For those skilled in the art, various changes and modifications to compositions and amounts in these embodiments are within the scope of the present disclosure, without departing from the spirit and scope of the disclosure.

The present disclosure provides a method for preparing a magnetic adsorbent used for superconducting magnetic separation, comprising the following steps:

preparing an iron-based gel by a ferric salt solution and an alkali solution, wherein, dropping the alkali solution slowly into the ferric salt solution and balancing the pH value between 4 to 7.5 under conditions of sufficient stirring, then continuing stirring for 5 to 30 min and standing for 60 min to 24 h to obtain the iron-based gel;

loading the obtained iron-based gel on a surface of ferrite by reaction in situ.

wherein the concentration range of ferric salt is 0.5 to 10 mmol/L and the concentration range of $OH^-$ in the alkali solution is 0.1 to 10 mol/L.

The suitable ferric salt is at least one of ferric chloride, ferric sulfate, ferric nitrate, polyferric chloride, polyferric sulfate and polyferric nitrate.

The suitable alkali solution is at least one of sodium hydroxide, potassium hydroxide and aqueous ammonia.

Further, the iron-based gel is loaded on the ferrite surface using the following method:

(1) adding polyacrylamide solution slowly into ferrite solution under conditions of sufficient stirring, in which the mass ratio of polyacrylamide to ferrite is 1:100 to 1:50000, and reacting for 30 to 120 min to obtain a ferrite suspension;

(2) adding an iron-based gel suspension slowly into the ferrite suspension obtained in (1) under conditions of sufficient stirring, in which the mass ratio of the iron-based gel and ferrite is 1:10 to 1:500, and reacting for 60 to 240 min.

The ferrite is at least one of manganous ferrite, copper ferrite, magnesium ferrite and ferroferric oxide.

Example 1

Preparation of materials: manganous ferrite was selected as ferrite. Formulating ferric chloride solution and sodium hydroxide solution separately, in which the concentration of ferric chloride was 10 mmol/L and the concentration of $OH^-$ in the sodium hydroxide solution was 10 mol/L; under conditions of sufficient stirring, dropping the sodium hydroxide solution slowly into the ferric chloride solution until the pH value was balanced to 4.0; continuing stirring for 30 min and standing for 24 h to obtain an iron-based gel suspension.

Preparation of magnetic adsorbent: under conditions of sufficient stirring, adding polyacrylamide solution slowly into a manganous ferrite suspension, in which the mass ratio of polyacrylamide to manganous ferrite was 1:50000, and reacting for 30 min; under conditions of sufficient stirring, adding the iron-based gel suspension slowly into the manganous ferrite suspension added with the polyacrylamide solution, in which the mass ratio of the iron-based gel to manganous ferrite was 1:500, and reacting for 60 min.

Application to arsenic-containing water purification: arsenic polluted water was source water for drinking of natural groundwater, and the concentration of arsenic in water was 0.2 mg/L. The magnetic adsorbents were added into the arsenic polluted water in the addition amount of 100 mg/L and then sufficiently mixed; after 5 min of the mixing reaction, water added with the magnetic adsorbents was brought into a continuous superconducting magnetic separation system for solid-liquid separation, and the treated water was discharged when the outflow from the separation system met the drinking water sanitary standard.

Example 2

Preparation of materials: copper ferrite was selected as ferrite. Formulating ferric nitrate solution and potassium hydroxide solution separately, in which the concentration of ferric nitrate was 0.5 mmol/L and the concentration of $OH^-$ in the potassium hydroxide solution was 0.1 mol/L; under conditions of sufficient stirring, dropping the potassium hydroxide solution slowly into the ferric nitrate solution until the pH value was balanced to 7.5; continuing stirring for 5 min, and standing for 60 min to obtain an iron-based gel suspension.

Preparation of magnetic adsorbent: under conditions of sufficient stirring, adding polyacrylamide solution slowly into a copper ferrite suspension, in which the mass ratio of polyacrylamide to copper ferrite was 1:100 and reacting for 120 min; under conditions of sufficient stirring, adding the iron-based gel suspension slowly into the ferrite suspension added with the polyacrylamide solution in which the mass ratio of the iron-based gel to ferrite was 1:10, and reacting for 240 min.

Application to arsenic-containing water purification: arsenic polluted water was industrial wastewater, and the concentration of arsenic in water was 20.0 mg/L. The magnetic adsorbents were added into the arsenic polluted water in the addition amount of 5 g/L and then sufficiently mixed; after 5 min of the mixing reaction, water added with the magnetic adsorbents was brought into a continuous superconducting magnetic separation system for solid-liquid separation, and the treated water was discharged when the outflow from the separation system met the industrial wastewater discharge standard.

Example 3

Preparation of materials: magnesium ferrite was selected as ferrite. Formulating ferric sulfate solution and aqueous ammonia solution separately, in which the concentration of ferric sulfate was 6 mmol/L and the concentration of $OH^-$ in the aqueous ammonia solution was 3 mol/L; under conditions of sufficient stirring, dropping the aqueous ammonia solution slowly into the ferric sulfate solution until the pH value was balanced to 6; continuing stirring for 15 min, and standing for 10 h to obtain an iron-based gel suspension.

Preparation of magnetic adsorbent: under conditions of sufficient stirring, adding polyacrylamide solution slowly into a magnesium ferrite suspension, in which the mass ratio of polyacrylamide to magnesium ferrite was 1:1000, and reacting for 60 min; under conditions of sufficient stirring, adding the iron-based gel suspension slowly into the ferrite suspension added with the polyacrylamide solution, in which the mass ratio of the iron-based gel to the ferrite was 1:50, and reacting for 120 min.

Application to arsenic-containing water purification: arsenic polluted water was polluted river water, and the concentration of arsenic in water was 5.0 mg/L. The magnetic adsorbents were added into the arsenic polluted water in the addition amount of 500 mg/L and then sufficiently mixed; after 3 min of the mixing reaction, the water added with the magnetic adsorbents was brought into a continuous superconducting magnetic separation system for solid-liquid separation, and the treated water was discharged when the outflow from the separation system met the quality standard of surface water environment.

Example 4

Preparation of materials: a mixture of ferroferric oxide and manganous ferrite at a mass ratio of 1:2 were used as ferrite. Formulating polyferric chloride solution and potassium hydroxide solution separately, in which the concentration of polyferric chloride was 3.5 mmol/L and the concentration of $OH^-$ in the potassium hydroxide solution was 6.5 mol/L; under conditions of sufficient stirring, dropping the potassium hydroxide solution slowly into the polyferric chloride solution until the pH value was balanced to 5.5; continuing stirring for 30 min, and standing for 5 h to obtain an iron-based gel suspension.

Preparation of magnetic adsorbent: under conditions of sufficient stirring, adding polyacrylamide solution slowly into a copper ferrite suspension, in which the mass ratio of polyacrylamide to copper ferrite was 1:25000, and reacting for 90 min; under conditions of sufficient stirring, adding the iron-based gel suspension slowly into the ferrite suspension added with the polyacrylamide solution, in which the mass ratio of the iron-based gel to the ferrite was 1:300, and reacting for 180 min.

Application to arsenic-containing water purification: arsenic polluted water was industrial wastewater, and the concentration of arsenic in the arsenic polluted water was 10.0 mg/L. The magnetic adsorbents were added into the arsenic polluted water in the addition amount of 1.5 g/L and then sufficiently mixed; after 5 min of the mixing reaction, the water added with the magnetic adsorbents was brought into a continuous superconducting magnetic separation system for solid-liquid separation, and the treated water was discharged when the outflow from the separation system met the industrial wastewater discharge standard.

What is claimed is:

1. A method for preparing a magnetic adsorbent used for superconducting magnetic separation, comprising the following steps:
    preparing an iron-based gel by a ferric salt solution and an alkali solution, wherein, dropping the alkali solution slowly into the ferric salt solution and balancing the pH value between 4 to 7.5 under conditions of sufficient stirring, then continuing stirring for 5 to 30 min and standing for 60 min to 24 h to obtain the iron-based gel;
    loading the obtained iron-based gel on a surface of ferrite by reaction in situ;
    wherein, the iron-based gel is loaded on the ferrite surface using the following method:
    (1) adding polyacrylamide solution slowly into ferrite solution under conditions of sufficient stirring, in which the mass ratio of polyacrylamide to ferrite is 1:100 to 1:50000, and reacting for 30 to 120 min to obtain a ferrite suspension;
    (2) adding a suspension of the iron-based gel slowly into the ferrite suspension obtained in (1) under conditions of sufficient stirring, in which the mass ratio of the iron-based gel and ferrite is 1:10 to 1:500, and reacting for 60 to 240 min.

2. The method of claim 1, wherein the concentration range of ferric salt is 0.5 to 10 mmol/L and the concentration range of OH− in the alkali solution is 0.1 to 10 mol/L.

3. The method of claim 1, wherein the ferric salt is at least one of ferric chloride, ferric sulfate, ferric nitrate, polyferric chloride, polyferric sulfate and polyferric nitrate; the alkali solution is at least one of sodium hydroxide, potassium hydroxide and aqueous ammonia.

4. The method of claim 1, wherein, the ferrite is at least one of manganous ferrite, copper ferrite, magnesium ferrite and ferroferric oxide.

* * * * *